US007889823B2

(12) United States Patent
Yang et al.

(10) Patent No.: US 7,889,823 B2
(45) Date of Patent: Feb. 15, 2011

(54) TIMING RECOVERY IN A PARALLEL CHANNEL COMMUNICATION SYSTEM

(75) Inventors: Xueshi Yang, Pittsburgh, PA (US);
Mehmet F. Erden, Pittsburgh, PA (US);
Erozan M. Kurtas, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1000 days.

(21) Appl. No.: 11/070,917

(22) Filed: Mar. 3, 2005

(65) Prior Publication Data

US 2006/0210002 A1 Sep. 21, 2006

(51) Int. Cl.
*H04B 1/10* (2006.01)
(52) U.S. Cl. .................. 375/350; 375/286; 375/238; 375/239; 455/507; 708/300
(58) Field of Classification Search ............. 375/350, 375/286, 238, 239; 455/507; 708/300
See application file for complete search history.

(56) References Cited

U.S. PATENT DOCUMENTS

| | | | | |
|---|---|---|---|---|
| 4,959,846 | A | 9/1990 | Apple et al. ............... 375/118 |
| 4,975,929 | A | 12/1990 | Apple et al. ............... 375/119 |
| 5,259,005 | A * | 11/1993 | LaRosa et al. ............ 375/355 |
| 5,661,485 | A | 8/1997 | Manuel ..................... 342/13 |
| 5,854,717 | A | 12/1998 | Minuhin .................... 360/65 |
| 5,907,587 | A | 5/1999 | Sokoler .................... 375/368 |
| 5,953,636 | A * | 9/1999 | Keate et al. ............. 455/3.02 |
| 6,038,267 | A | 3/2000 | Oura et al. ............... 375/329 |
| 6,067,198 | A * | 5/2000 | Zuffada et al. ............ 360/46 |
| 6,604,203 | B1 | 8/2003 | Mu et al. .................. 713/400 |
| 7,522,678 | B2 * | 4/2009 | Ashley et al. ............. 375/341 |
| 2003/0011920 | A1 | 1/2003 | Tsuchinaga ............... 360/46 |
| 2003/0028715 | A1 * | 2/2003 | Maple et al. .............. 711/111 |
| 2003/0072099 | A1 | 4/2003 | Annampedu .............. 360/53 |
| 2003/0107831 | A1 * | 6/2003 | Erden et al. ............... 360/31 |
| 2003/0221142 | A1 * | 11/2003 | Kim et al. ................. 714/700 |
| 2004/0062333 | A1 | 4/2004 | Bertschmann et al. ...... 375/376 |
| 2004/0091069 | A1 | 5/2004 | Liu et al. .................. 375/350 |
| 2004/0125868 | A1 * | 7/2004 | Keller et al. .............. 375/150 |
| 2004/0196941 | A1 | 10/2004 | Hsu ......................... 375/376 |
| 2004/0254788 | A1 | 12/2004 | Eller et al. ................ 704/219 |
| 2006/0119964 | A1 * | 6/2006 | Eleftheriou et al. .......... 360/46 |

OTHER PUBLICATIONS

K.H. Mueller and M. Muller, "Timing Recovery in Digital Synchronous Data Receivers,"IEEE Trans. Comm., vol. COM-24, No. 5, pp. 516-531, 1976.
L. E. Franks, "Carrier and Bit Synchronization in Data Communication—A Tutorial Review," IEEE Trans. Comm., vol. COM-28, No. 8, pp. 1107-1121, 1980.
Giacoletto, L. J. "Methods of Pulse Modulation." *Electronics Designers' Handbook.* Second edition. McGraw-Hill, Inc. 1977. Three pages.
Jorgensen, Finn. "Playback Waveforms (Read)." *The Complete Handbook of Magnetic Recording.* Third edition. TAB Professional and Reference Books. 1988. Three pages.

\* cited by examiner

*Primary Examiner*—Shuwang Liu
*Assistant Examiner*—Michael R Neff
(74) *Attorney, Agent, or Firm*—David C. Bohn; Westman, Champlin & Kelly, P.A.

(57) ABSTRACT

A parallel channel timing recovery circuit. The parallel timing recovery circuit comprises multiple prefilters receiving parallel channel outputs and providing prefilter outputs. Multiple sampling filters receive the prefilter outputs and provide multiple discrete time signal samples. A self-timing circuit has multiple inputs receiving the multiple discrete time signal samples. The self-timing circuit provides a sampling control output to the sampling filters. The sampling control output is based on a composite of the multiple discrete time signal samples. Each of the sampling filters generates a discrete time signal sample based on the sampling control output and the prefilter outputs.

20 Claims, 8 Drawing Sheets

TIMING RECOVERY IN A PARALLEL CHANNEL COMMUNICATION SYSTEM

FIELD OF THE INVENTION

The present invention relates generally to parallel communication channels, and more particularly but not by limitation to data storage devices with multiple read channels.

BACKGROUND OF THE INVENTION

In data storage devices such as disc drives, data is read from a disc by a read operation that involves a mechanical scanning motion of a disc moving relative to a read head. The read data is initially in synchronization with the mechanical motion during writing and needs to be resynchronized as the data is read processed by a computer. This process of resynchronization is accomplished by a timing recovery circuit.

In some disc drives, there is an array of multiple read heads that are reading data simultaneously (i.e., in parallel) on multiple read channels. Each of the multiple channels includes a timing recovery circuit. As the number of parallel channels increases in newer, larger disc drives, the signal-to-noise ratios (SNR's) are degraded, and the multiple timing recovery circuits consume increasing amounts of electrical power and circuit resources in the disc drive. Furthermore, one or more of the timing recovery circuits may not gain synchronization at all due to the degradation of SNR.

The read/write channel of a disc drive is just one example of a general problem of communication channels with increasing numbers of parallel data channels that require timing recovery, but that are increasingly consuming excess electrical power and computing resources to perform timing recovery functions in a receiver portion of the communication channel.

A method and apparatus are needed to provide timing recovery in communication channels that include multiple parallel channels without excess consumption of electrical power and circuit resources in performing the timing recovery. Embodiments of the present invention provide solutions to these and other problems, and offer other advantages over the prior art.

SUMMARY OF THE INVENTION

Disclosed is a parallel channel timing recovery circuit. The parallel timing recovery circuit comprises multiple prefilters receiving parallel channel outputs and providing prefilter outputs. Multiple sampling filters receive the prefilter outputs and provide multiple discrete time signal samples. A self-timing circuit has multiple inputs receiving the multiple discrete time signal samples. The self-timing circuit provides a sampling control output to the sampling filters. The sampling control output is based on a composite of the multiple discrete time signal samples. Each of the sampling filters generates a discrete time signal sample based on the sampling control output and the prefilter outputs.

In one preferred embodiment, the parallel channel outputs comprise parallel read channel output in a data storage system, and the self-timing circuit restores timing lost in the writing and reading processes in the data storage system. In another preferred embodiment, the multiple sampling filters comprise sampling switches. In still another preferred embodiment, the self timing circuit comprises multiple single channel timing error detectors whose outputs are combined in a multiple-input-single-output (MISO) circuit.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, a parallel channel timing recovery circuit resynchronizes incoming parallel (simultaneous) data streams. The incoming parallel data streams are prefiltered and sampled to provide sample outputs. Sampling is controlled by a sampling control output that is based on a composite of sampled outputs that are combined in a joint timing and data detector. The parallel timing recovery circuit can be used with parallel channels of data read from a data storage system with an array of parallel read heads, such as a disc drive. The parallel timing recovery circuit can also be used with other communication channels.

Timing recovery in parallel channels of data includes a process of recovering a read clock at the symbol rate that is phase-locked to the incoming readback signals. In recording channels, timing is recovered from the incoming signal itself, referred to as self-timing. The performance of self-timing depends critically on the amount of timing information present in the data signal. As recording densities increase, signal-to-noise ratio (SNR) degrades, which reflects a decreased amount of timing information. At the same time, decreased SNR demands more accurate timing recovery, which renders timing recovery a more critical task.

A variety of timing recovery methods are known. Some examples include the maximum-likelihood timing recovery, the threshold crossing based timing recovery, and the minimum mean-square-error (MMSE) timing recovery. All these methods are concerned with the timing recovery of a single received signal r(t). In some storage devices, in particular in probe storage devices, there are a plurality of read heads simultaneously reading signals from the storage media.

Although theoretically it is possible to apply any of the existing timing recovery algorithm separately to each read head, the complexity is prohibitive considering that there are possibly hundreds of read heads simultaneously reading signals from the media. Moreover, the performance of such schemes is not ideal as it is not taking advantage of the multiple readback signals which contain similar timing information. These problems are overcome in the embodiments described below.

Figure 1:
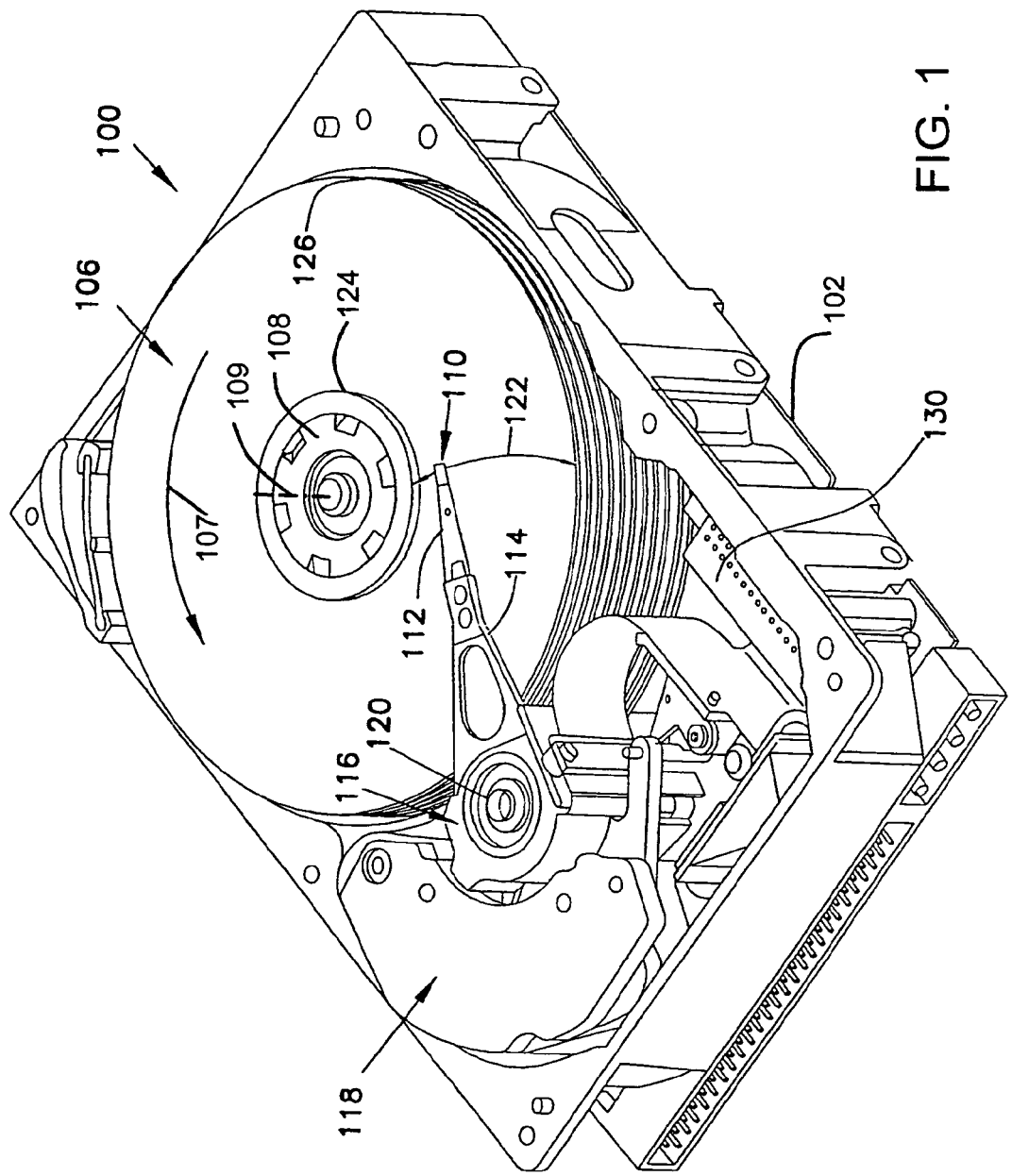
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109 in a direction indicated by arrow 107. Each disc surface has an associated disc head slider 110 which is mounted to disc drive 100 for simultaneous communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over desired data tracks along an arcuate path 122 between a disc inner diameter 124 and a disc outer diameter 126. Voice coil motor 118 is driven by servo electronics 130 based on signals generated by heads 110 and a host computer (not shown).

Figure 2:
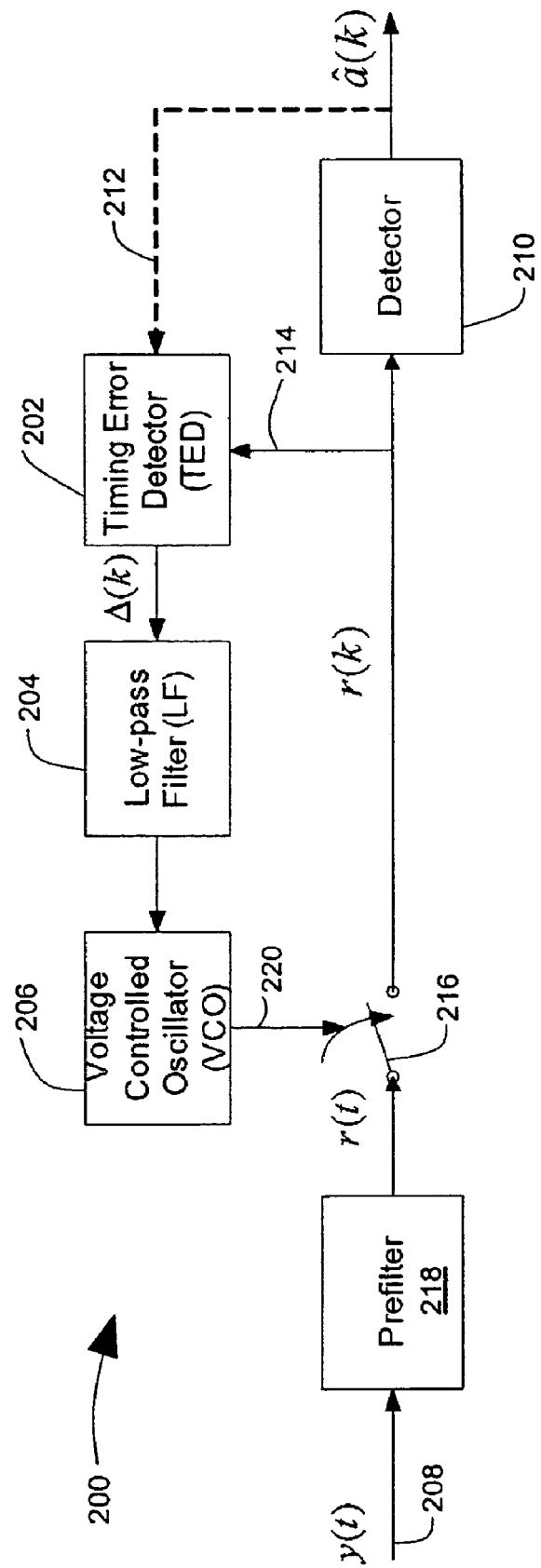
FIG. 2 illustrates a block diagram of inductive timing recovery in a data channel.

FIG. 2 illustrates a general architecture 200 of an inductive timing recovery scheme for a single channel. Such a timing recovery scheme is known, for example, from L. E. Franks, "Carrier and Bit Synchronization in Data Communication—A Tutorial Review," IEEE Trans. Comm., Vol. COM-28, No. 8, pp. 1107-1121, 1980. The architecture 200 comprises a timing error detector (TED) 202, a loop low-pass filter (LF) 204 and a voltage controlled oscillator (VCO) 206. The timing algorithm operates in two successive modes or phases: an acquisition phase and a tracking phase.

In the acquisition phase, a read output y(t) 208 provides a predetermined, known data pattern, such as a data preamble in front of each user data block. Since the pattern of data in the data pattern during the acquisition phase is known perfectly in advance, the timing error detector 202 can lock very reliably and precisely on to the phase of the known data pattern, even when there is noise present in the read output y(t) 208. The VCO 206 can be reliably locked during the acquisition phase so that a detector 210 can make reliable decisions using the sampled signals. After the acquisition phase, the transmitted (or recorded) bits are no longer known in advance to the TED 202 and the timing circuit enters into the tracking phase, where the channel detector decisions 212 are used instead of a discrete time signal sample 214 from a sampling switch 216. A prefilter 218 limits the bandwidth of read output data applied to sampling switch 216 to filter out out-of-band noise or prevent aliasing.

Depending on the algorithm chosen, the timing error detector (TED) 202 calculates the timing error at a given bit period k by exploiting the current bit input â(k), the current signal sample r(k) as well as their historical values. The calculated timing error estimate Δ(k) is then filtered by the loop low-pass filter (LF) 204 to obtain the input value to the voltage controlled oscillator (VCO) 206, which in turn controls the sampling phase of a VCO output 220 for the next signal sample.

When the readback signal consists of parallel waveforms from a plurality of read heads, there are a lot of options in realizing timing recovery. The most straightforward way will be applying independent timing recovery circuits as in FIG. 2 for each individual read head and its associated channel. However, the complexity and cost associated with this approach is very high or prohibitive, in particular when the multiplexing degree reaches the level of tens or hundreds, even thousands in certain system configurations. Yet another different approach will be to implement one timing circuit operating on the readback signal from one single read head, say $r_1(t)$. The calculated sampling phase (after VCO) is then used to sample all the incoming signals $r_i(t)$, i=1, . . . , M. Such an approach will reduce the complexity and cost, however, the performance is not ideal, as it simply ignores the timing information conveyed in the rest of the incoming signals, $r_2(t), \ldots, r_M(t)$.

In the embodiments described in FIGS. 3-7, unless otherwise indicated, there are M read heads simultaneously accessing storage media for reading data signals in parallel. A plurality of signals sampled from these parallel heads are represented by $r_1(t), r_2(t), \ldots, r_M(t)$ respectively. The plurality of sampled signals are sampled by their respective sampling filters. The plurality of sampling filters are locked to a phase of a composite sampling control output, which is derived from a common phase-lock loop (PLL) and coupled to each of the sampling filters. Various types of sampling filters and various methods of generating the sampling phase from the multiple readback waveforms $r_i(t)$, i=1, . . . , M by using a common PLL are described below.

Figure 3:
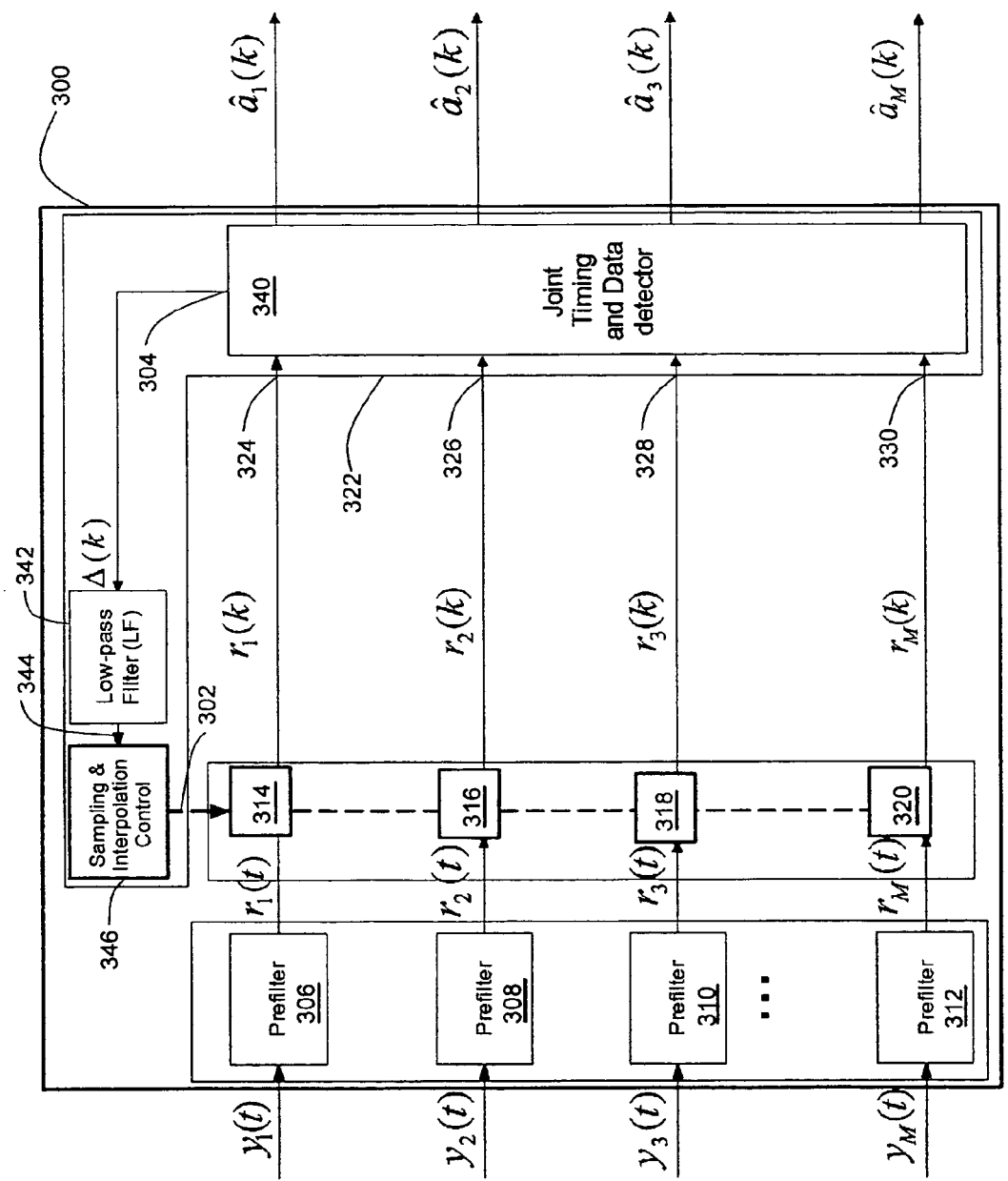
FIG. 3 illustrates a block diagram of a first embodiment of a parallel channel timing recovery circuit that includes a sampling control output based on a composite of discrete time signal samples.

FIG. 3 illustrates a block diagram of a first embodiment of a parallel channel timing recovery circuit 300 that includes a sampling control output 302 based on a composite 304 of discrete time signal samples $r_1(k), r_2(k), r_3(k) \ldots r_M(k)$. The timing recovery circuit 300 receives multiple simultaneous data channels $y_1(t), y_2(t), y_3(t) \ldots y_M(t)$ from parallel read heads or other parallel data channels.

A number M of multiple prefilters 306, 308, 310 . . . 312 are provided in the timing recovery circuit 300. The prefilters 306, 308, 310, 312 each receive one of the data channels $y_1(t)$, $y_2(t), y_3(t) \ldots y_M(t)$ and provides a corresponding prefilter output $r_1(t), r_2(t), r_3(t) \ldots r_M(t)$. The prefilters 306, 308, 310, 312 are preferably bandpass filters with a passband corresponding to the bandwidth of the data expected at the data channels $y_1(t), y_2(t), y_3(t) \ldots y_M(t)$. The prefilters 306, 308, 310, 312 filter out noise. The prefilters 306, 308, 310, 312 can also limit the bandwidth of the prefilter outputs $r_1(t), r_2(t), r_3(t) \ldots r_M(t)$ to reduce aliasing in sampling filters 314, 316, 318, 320 that receive the prefilter outputs $r_1(t), r_2(t), r_3(t) \ldots r_M(t)$.

Each of the multiple sampling filters 314, 316, 318, 320 receives the sampling control output 302 which controls sampling. Each of the sampling filters 314, 316, 318, 320 provides a discrete time signal sample $r_1(k), r_2(k), r_3(k) \ldots r_M(k)$. Each of the multiple discrete time signal samples $r_1(k), r_2(k), r_3(k) \ldots r_M(k)$ are coupled to a self timing circuit 322. The discrete time signal samples $r_1(k), r_2(k), r_3(k) \ldots r_M(k)$ are each synchronized with the sampling control output 302.

The self-timing circuit 322 has multiple inputs 324, 326, 328, 330 receiving the multiple discrete time signal samples $r_1(k), r_2(k), r_3(k) \ldots r_M(k)$. The self-timing circuit 322 provides the sampling control output 302 to the sampling filters 314, 316, 318, 320 such that each of the sampling filters 314, 316, 318, 320 generates a discrete time signal sample $r_1(k)$, $r_2(k), r_3(k) \ldots r_M(k)$ based on a composite of the multiple discrete time signal samples $r_1(k), r_2(k), r_3(k) \ldots r_M(k)$.

Figure 8:
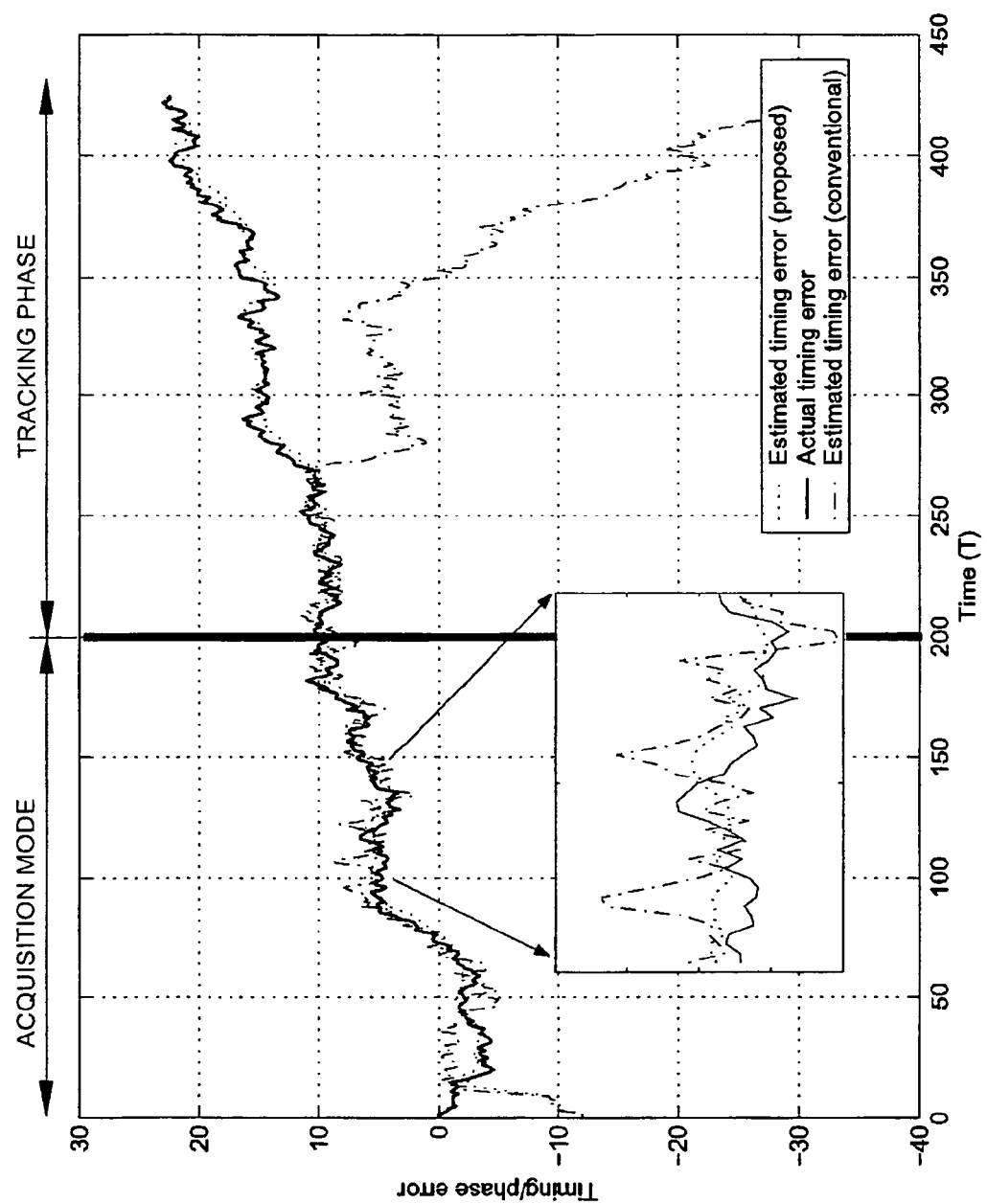
FIG. 8 illustrates a graph of timing (phase) error as a function of time during an acquisition mode and a tracking phase for the timing recovery circuit shown in FIG. 7.

The self-timing circuit 322 preferably senses the discrete time signal samples $r_1(k), r_2(k), r_3(k) \ldots r_M(k)$ during an acquisition time interval, and provides the sampling control output 302 during a tracking time interval. The acquisition and tracking time intervals are described in more detail below in connection with FIG. 8.

A joint timing and data detector circuit 340 estimates the data bits $\hat{a}_i(k)$ as well as the common timing error estimate $\Delta(k)$ 304. The common timing error estimate 304 is low-pass filtered in low pass filter 342 to estimate updated timing information. The common timing error estimate 304 is generated by the joint timing and data detector circuit 340, whose inputs $r_i(k)$ are the synchronized (sampled) waveform samples from the parallel channels. A timing update 344 is obtained by low-pass filtering the timing error estimate 304. The sampling control output 302 is generated by sampling and interpolation control 346 as a function of the timing update 344. The sampling control output 302 can alternatively be generated by a VCO, and the sampling filters 314, 316, 318, 320 can comprise analog to digital converters (A/D) or sample and hold circuits.

The self-timing circuit 322 preferably comprises a composite timing error detector (not illustrated in FIG. 3) which provides the composite timing error output 304 during the acquisition and tracking intervals. This is explained in more detail below in connection with examples in FIGS. 5-7.

Figure 4:
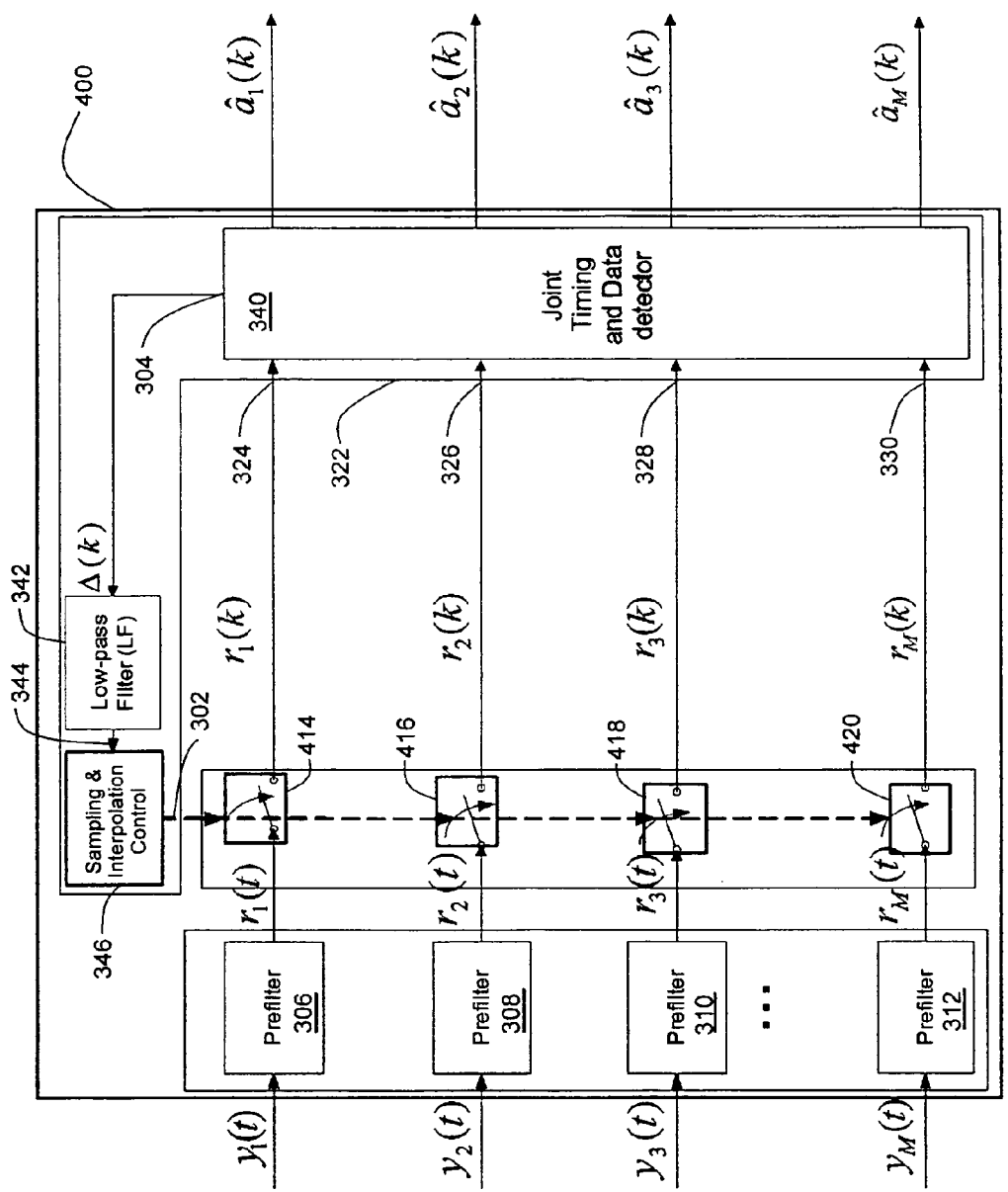
FIG. 4 illustrates a block diagram of a second embodiment of a parallel channel timing recovery circuit that includes a sampling control output based on a composite of discrete time signal samples.

FIG. 4 illustrates a block diagram of a second embodiment of a parallel channel timing recovery circuit 400 that includes a sampling control output 302 based on a composite 304 of discrete time signal samples. Reference designations used in FIG. 4 that are the same as reference designations used in FIG. 3 identify the same or similar features. In FIG. 4, the sampling filters 314, 316, 318, 320 of FIG. 3 comprise sampling switches 414, 416, 418, 420 that are controlled by the sampling control output 302. In other respects, the recovery circuit 400 in FIG. 4 is similar to the recovery circuit 300 in FIG. 3.

Figure 5:
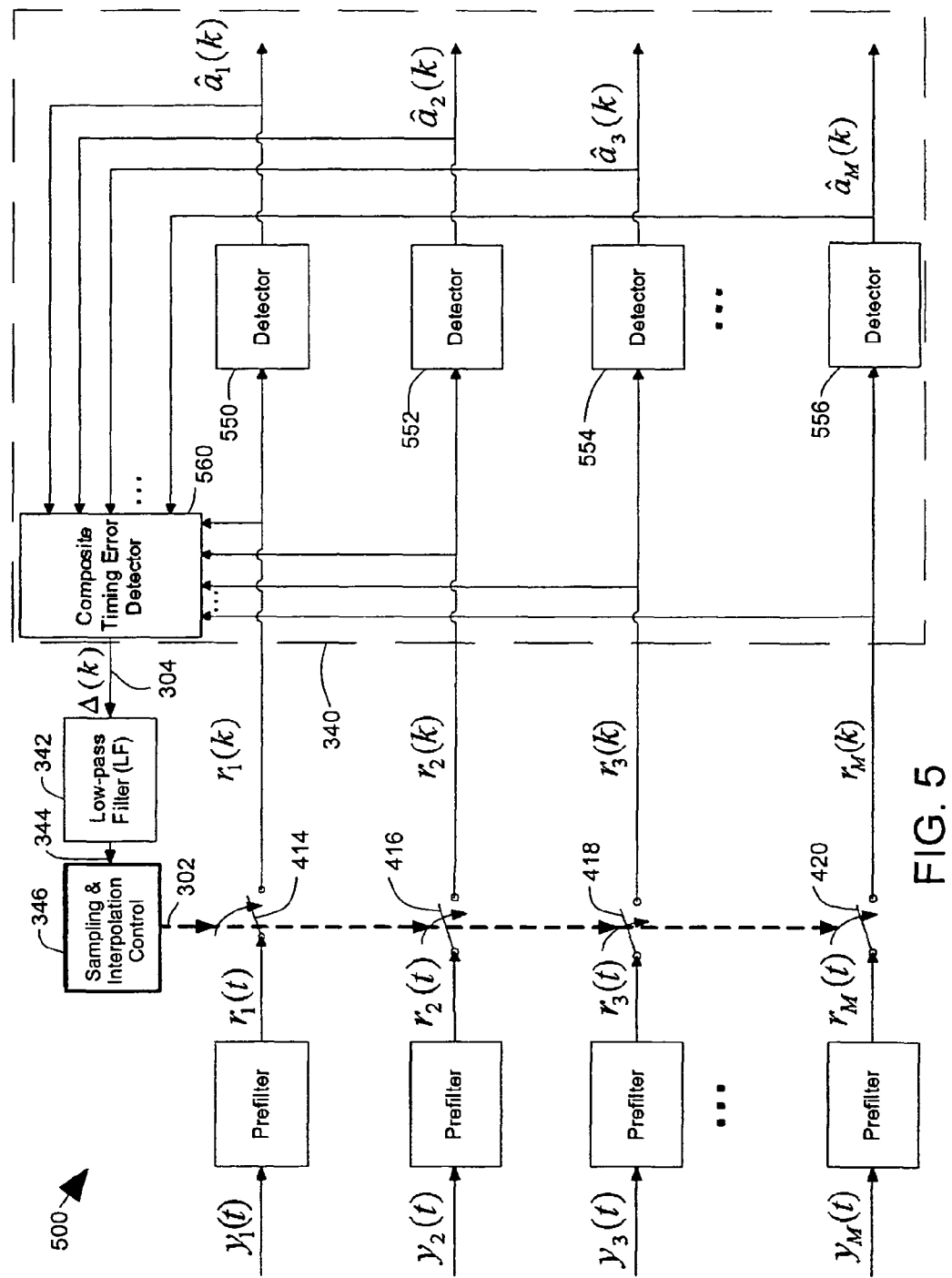
FIG. 5 illustrates a block diagram of a third embodiment of a parallel channel timing recovery circuit that includes a sampling control output based on a composite of discrete time signal samples.

FIG. 5 illustrates a block diagram of a third embodiment of a parallel channel timing recovery circuit 500 that includes a sampling control output based on a composite of discrete time signal samples. Reference designations used in FIG. 5 that are the same as reference designations used in FIGS. 3-4 identify the same or similar features.

In FIG. 5, the joint timing and data detector 340 comprises a plurality of independent detectors 550, 552, 554, 556 and a composite timing error detector (C-TED) circuit 560 that extracts timing error estimates from the parallel incoming signals $r_i(k)$ and their corresponding decision outputs $\hat{a}_i(k)$ from the detectors 550, 552, 554, 556.

The C-TED 560 receives input from the multiple sampled waveforms $r_i(k)$ as well as the decision outputs $\hat{a}_i(k)$ from the detectors (or preambles during the acquisition phase) to compute the current timing error estimate 304. The output 304 from the C-TED 560 is then low-pass filtered in low pass filter 342 before it is applied as a control input 344 to the sampling and interpolation control 346. The sampling and interpolation control 346 typically comprises a VCO.

Figure 6:
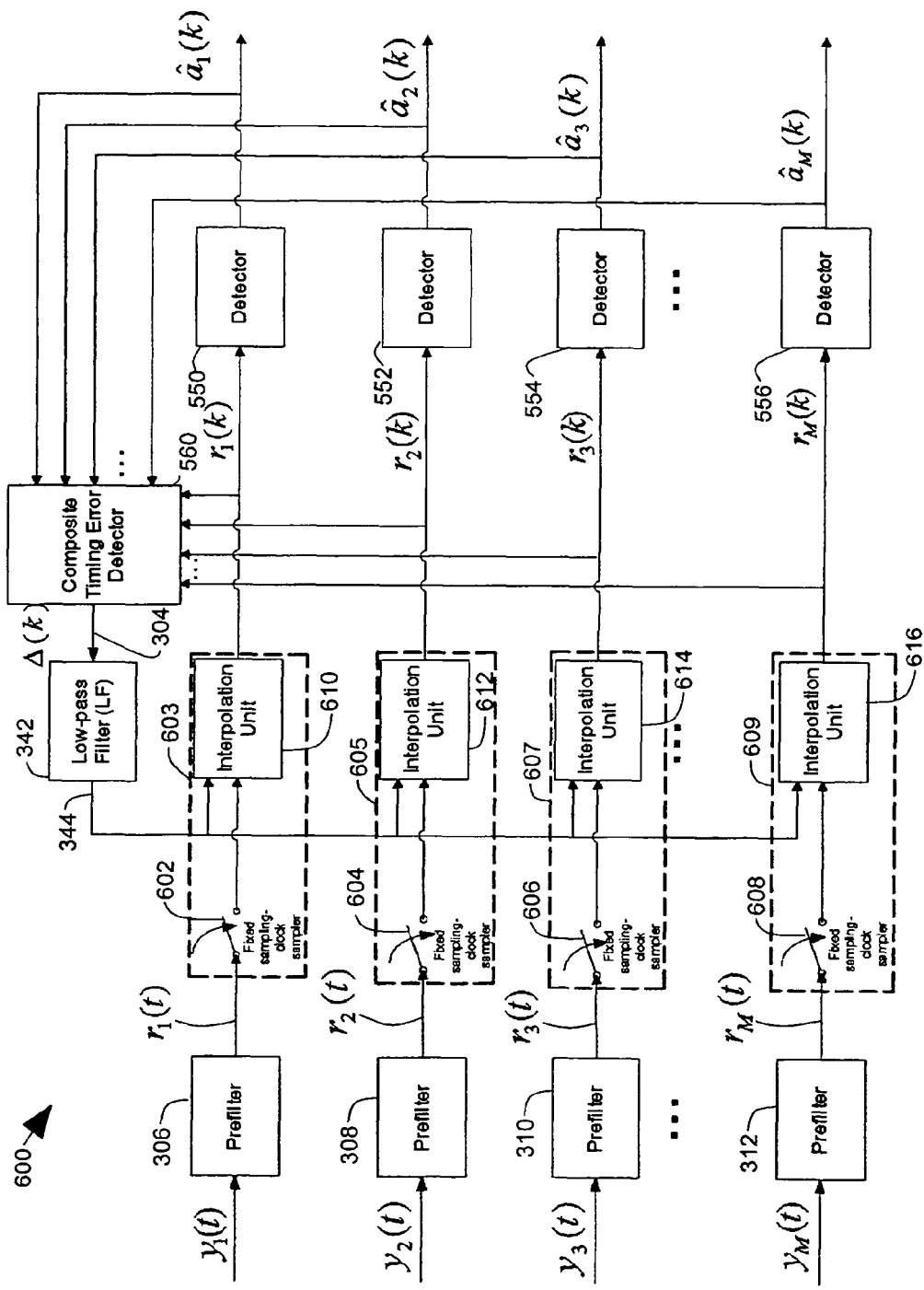
FIG. 6 illustrates a block diagram of a fourth embodiment of a parallel channel timing recovery circuit that includes a sampling control output based on a composite of discrete time signal samples.

FIG. 6 illustrates a block diagram of a fourth embodiment of a parallel channel timing recovery circuit 600 that includes a sampling control output 344 based on a composite of discrete time signal samples $r_i(k)$. Reference designations used in FIG. 6 that are the same as reference designations used in FIGS. 3-5 identify the same or similar features.

In FIG. 6, the sampling switches 414, 416, 418, 420 of FIG. 5 are replaced with sampling filters 603, 605, 607, 609. Each of the sampling filters 603, 605, 607, 609 include a fixed sampling-clock sampling switch 602, 604, 606, 608 connected in cascade with an interpolation filter 610, 612, 614, 616. In FIG. 6, the sampling and interpolation control 346 of FIG. 5 is not used, and the low pass filter output 344 couples directly to the interpolation filters 610, 612, 614, 616. The switches 602, 604, 606, 608 are controlled by a fixed clock rather than from a variable frequency oscillator (VCO) output. Collectively, the circuit in FIG. 6 forms an interpolated timing recovery scheme. The input to the interpolater filters 610, 612, 614, 616 is the low-pass filtered C-TED output 344. In other respects, the circuit of FIG. 6 is similar to the circuit of FIG. 5.

Figure 7:
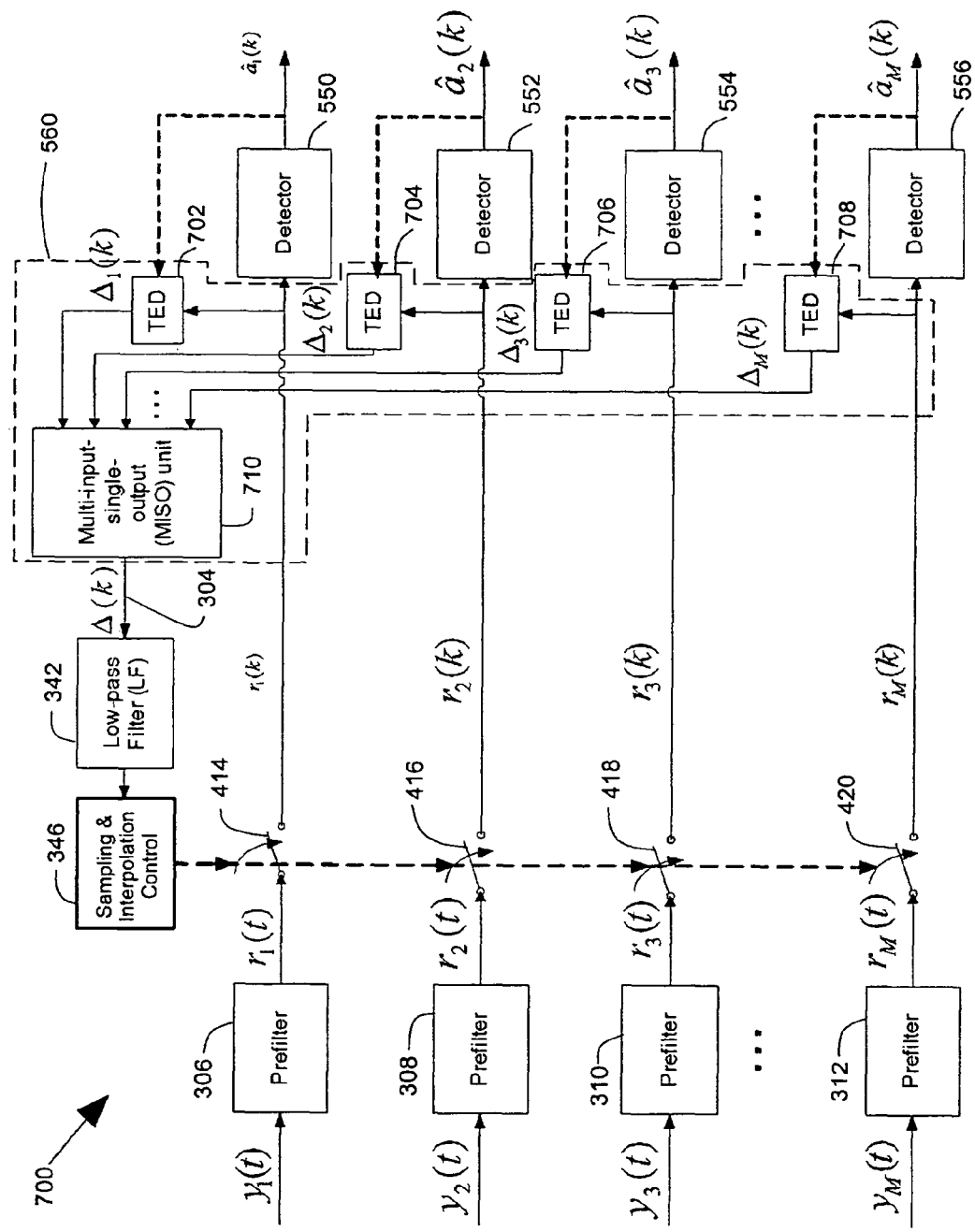
FIG. 7 illustrates a block diagram of a fifth embodiment of a parallel channel timing recovery circuit that includes a sampling control output based on a composite of discrete time signal samples.

FIG. 7 illustrates a block diagram of a fifth embodiment of a parallel channel timing recovery circuit 700 that includes a sampling control output based on a composite of discrete time signal samples. Reference designations used in FIG. 7 that are the same as reference designations used in FIGS. 3-6 identify the same or similar features.

In FIG. 7, the composite timing error detector (C-TED) circuit 560 comprises single channel timing error detectors (TED's) 702, 704, 706, 708 for each channel, and a multiple-input-single-output (MISO) circuit 710. The MISO circuit 710 receives outputs from the single channel TED's 702, 704, 706, 708. Each single channel TED receives $r_i(k)$ and $\hat{a}_i(k)$ for the $i^{th}$ channel. The MISO circuit 710 combines the multiple single channel TED outputs to form a composite output 304.

For each individual incoming signal $r_i(t)$, there is an independent TED. The output of the parallel TED's are then input to a multiple input-single-output (MISO) functional block in FIG. 7, where the parallel timing errors are transformed to a single timing error output via Equation 1

$$\Delta(k) = F(\Delta_1(k), \Delta_2(k), \ldots, \Delta_M(k)), \quad \text{Equation 1}$$

where F(.) is a MISO many-to-one mapping function. In our preferred embodiment, F(.) takes the form of a linear transformation, i.e., the output of the functional block is Equation 2:

$$\Delta(k) = \sum_{i=1}^{M} c_i \Delta_i(k) \quad \text{Equation 2}$$

where $c_i$, i=1, ..., M are the linear coefficients and satisfy Equation 3:

$$\sum_{i=1}^{M} c_i = 1. \quad \text{Equation 3}$$

For example, a practical choice of $c_i$'s is Equation 4:

$$c_i = \frac{1}{M}, i = 1, \ldots, M. \quad \text{Equation 4}$$

The coefficients of $c_i$'s can be fixed, or alternatively adaptive. For instance, if some read heads become defective due to wear and tear, among many other possible reasons, the weight coefficients corresponding to those heads can be set to zero and the timing error will be only calculated from signals originated from the normal functional read heads. Further improvement of the scheme can be attained by utilizing quality information from individual channels. For example, if a soft-output detector (e.g., soft-output Viterbi algorithm) is used as the channel detector, the reliability output of each bit can be exploited by the C-TED to adjust the weighing coefficients $c_j$. Specifically, if the current bit from the j-th channel detector is associated with a low reliability value, $c_j$ can be geared smaller than coefficients corresponding to channels with higher reliability values, on-the-fly.

The algorithm of TED can be adapted to the specific application. For example, if Mueller and Muller (MM) timing gradient is applied and inter-symbol-interference (ISI) is absent, the timing error detector output for the i-th signal is simply given by $$\Delta_i(k) = r_i(k)\hat{a}_i(k-1) - r_i(k-1)\hat{a}_i(k), \text{ for } i=1,\ldots,M \qquad \text{Equation 5}$$

where $\hat{a}_i(k)$ are either given by the preamble bits (in acquisition phase) or the channel detector (in tracking phase). MM timing gradient is known, for example, from K. H. Mueller and M. Muller, "Timing recovery in digital synchronous data receivers," IEEE Trans. Comm., vol. COM-24, no. 5, pp. 516-531, 1976.

If ISI is present in the channel, Equation 5 becomes Equation 6:

$$\Delta_i(k) = r_i(k)\hat{z}_i(k-1) - r_i(k-1)\hat{z}_i(k), \text{ for } i=1,\ldots,M \qquad \text{Equation 6}$$

where $$\hat{z}_i(k) = \sum_{m=1}^{L} \hat{a}_i(k-m) * g(m). \qquad \text{Equation 7}$$

Here, g(m) represents the ISI or equalization target, L is the target length and * denotes the convolution operation. For practical implementations, to reduce the computation cost (in particular the number of multiplications), the linear combination of Equation 2 can be exercised on the signal samples, say $r_i(k)$ and $r_j(k)$, provided that $\hat{a}_i(l) = \hat{a}_j(l)$, for $l=k, k-1, \ldots, k-L-1$, and a causal target g(m).

It should be noted that in FIG. 7 different TED detectors other than MM detector can be applied. Examples include the early-late TED, MMSE TED, and maximum-likelihood TED. In addition, a different implementation emerges as the VCO unit and the samplers are replaced by fixed-clock samplers and interpolation units, as shown in FIG. 6.

The timing recovery embodiments of FIGS. 5-6 are applicable to any communication systems where the multiple incoming signals having similar timing errors. The linear combination operation functions as a noise canceller, which effectively mitigates the effect of electronics/medium noise, decision errors on $\hat{a}_i(k)$, and sampler phase noise on timing error estimation.

The effectiveness of the proposed algorithm is illustrated by a simulation of a parallel channel (10 active read heads) with their transition response modeled as the Error function, i.e., $$h(t) = V_p \text{erf}\left(\frac{2\sqrt{\ln 2}}{D_u} t\right) \qquad \text{Equation 8}$$

where $D_u$ is the normalized linear density and $V_p$ is the peak amplitude of an isolated transition. A setting of $V_p = 0.6134$ was used such that the energy of the derivative of h(t) is 1. The signal to noise definition we used is Equation 9:

$$SNR = \frac{E_i}{N_0}, \qquad \text{Equation 9}$$

where, $E_i$ is the energy of the derivative of the transition response, which is equal to 1 this simulation, and $N_0$ is the single side power-spectrum density height of the electronics noise. Medium noise is specified separately as a percentage of the bit length. The readback signal for the i-th head is calculated from Equation 10:

$$r_i(t) = \sum_k b_i(k) h(t - kT + \Delta t_i(k)) + e_i(t) \qquad \text{Equation 10}$$

where $b_i(k)$ is the transition sequence, i.e., $$b_i(k) = \frac{a_i(k) - a_i(k-1)}{2}, \qquad \text{Equation 11}$$

$a_i(k)$ is the user bit sequence (+1 or −1), T is the bit interval, $\Delta t_i(k)$ is the transition jitter and $e_i(t)$ is the electronics noise, assumed to be additive white Gaussian noise (AWGN). The transition jitter $\Delta t_i(k)$ assumes Gaussian distribution with cut-off value T/2, i.e., $|\Delta t_i(k)| < T/2$. The standard deviation of $\Delta t_i(k)$ is T/10. To simulate the common timing error, a first-order Markov model is used. That is, the timing error at time k is given by $$\tau_k = \phi_k + \mu + \tau_{k-1} \qquad \text{Equation 12}$$

where $\phi_k$ is independent and identically distributed (i.i.d.) Gaussian distributed with zero-mean and standard deviation of 0.05T, and $\mu = 0.005T$. Apparently, $\phi_k$ models the random phase noise presented in the system while $\mu$ is the constant frequency offset between the read and write process. The actual readback signal is thus given by $$r_i'(t) = \sum_k a_i(k)[h(t - kT + \Delta t_i(k) - \tau_k) - \qquad \text{Equation 13}$$
$$h(t - (k+1)T + \Delta t_i(k+1) - \tau_k)]/2.$$

The timing recovery scheme shown in FIG. 7 is applied. A typical timing error plot is plot in FIG. 8 where the SNR is 16 dB with normalized density $D_u$. The solid line denotes the actual simulated timing error, while the dashed-dot line and dotted line represent the estimated timing error by conventional Mueller and Muller (MM) timing recovery (using one incoming signal) and the proposed timing algorithm respectively. For the simulation results shown here, the linear coefficients $c_i$ was set to 1/M. For the first 200 samples, the timing algorithm is set in acquisition mode. In other words, the first 200 recorded bits are perfectly known to the TED. Other parameters, i.e., the loop low-pass filter and the VCO parameters remains the same for both algorithms. It can be seen that the conventional MM algorithm gives rise to larger discrepancies between the estimated and actual timing error than the proposed architecture. After the 200-th symbol, the timing algorithm enters into the tracking phase, where the $\hat{a}_i(k)$'s in Equation 5 are obtained from the channel detector (in the simulations, the detector is a simple slicer). From FIG. 8, the conventional MM algorithm soon lost tracking (entered into cycle slip mode) around the 270-th sample, while the simulated arrangement of FIG. 7 continues to perform well throughout the sector.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the timing recovery system while maintaining substantially the same functionality without departing from the scope and spirit of the present invention. In addition, although the preferred embodiment described herein is directed to a storage media system for data, it will be appreciated by those skilled in the art that the teachings of the present invention can be applied to other types of digital communication channels, without departing from the scope and spirit of the present invention.

What is claimed is:

1. A parallel channel timing recovery circuit, comprising:
    an array of parallel read heads that provide parallel channel outputs of data;
    multiple prefilters receiving the parallel channel outputs and providing prefilter outputs;
    multiple sampling filters receiving the prefilter outputs and providing multiple discrete time signal samples; and
    a self-timing circuit that has multiple inputs receiving the multiple discrete time signal samples and that provides a sampling control output based on a linear transformation comprising coefficients that are adaptive for wear of the parallel read heads, the sampling control output coupling to the multiple sampling filters to control sampling.

2. The parallel channel timing recovery circuit of claim 1 wherein parallel channel inputs are read channel inputs of a data storage system, and the self-timing circuit restores read channel timing lost by storing and retrieving data in the data storage system.

3. The parallel channel timing recovery circuit of claim 1 wherein the self-timing circuit further comprises a joint timing and data detector that provides timing error outputs for acquisition and tracking.

4. The parallel channel timing recovery circuit of claim 1 wherein the self-timing circuit further comprises data detectors and a composite timing error detector which provides timing error outputs during acquisition and tracking intervals.

5. The parallel channel timing recovery circuit of claim 4 wherein the composite timing error detector comprises a plurality of independent timing error detectors, each independent timing error detector providing a channel timing error output for one of the parallel channels.

6. The parallel channel timing recovery circuit of claim 5 wherein each of the channel timing error outputs couples to a multiple-input-single-output circuit, and the multiple-input-single-output circuit provides the linear transformation.

7. The parallel channel timing recovery circuit of claim 6 wherein the coefficients are adapted based on quality information associated with the parallel channels.

8. The parallel channel timing recovery circuit of claim 7 wherein the coefficients for defective read heads in the array are adapted to a zero setting.

9. The parallel channel timing recovery circuit of claim 8 wherein the linear transformation is based on only the read heads that are not the defective read heads.

10. The parallel channel timing recovery circuit of claim 1 wherein the multiple sampling filters comprise sampling switches.

11. The parallel channel timing recovery circuit of claim 1 wherein the multiple sampling filters comprise interpolation filters.

12. The parallel channel and timing recovery circuit of claim 1 wherein the parallel channel outputs of data provide the data simultaneously.

13. A method of recovering timing for parallel channels, comprising:
    providing an array of parallel read heads that provide parallel channel outputs of data;
    providing multiple prefilters receiving the parallel channel outputs and providing prefilter outputs;
    sampling the prefilter outputs with sampling filters and providing multiple discrete time signal samples; and
    receiving the multiple discrete time signal samples at multiple inputs of a self-timing circuit and providing a sampling control output that is based on an adaptive linear transformation using adaptive coefficients and the sampling control output controlling sampling of the sampling filters; and
    generating the multiple discrete time signal samples based on the sampling control output.

14. The method of claim 13 wherein the self-timing circuit comprises a joint timing and data detector performing the adaptive linear transformation for acquisition and tracking.

15. The method of claim 14 wherein the self-timing circuit further comprises data detectors and a composite timing error detector providing timing error outputs during acquisition and tracking intervals.

16. The method of claim 15 wherein the composite timing error detector comprises a plurality of independent timing error detectors, each independent timing error detector providing a channel timing error output for one of the parallel channels.

17. The method of claim 16 wherein each of the channel timing error outputs couples to a multiple-input-single-output circuit, and the multiple-input-single-output circuit generating the adaptive linear transformation.

18. A parallel channel timing recovery circuit, comprising:
    an array of parallel read heads that provide parallel channel outputs of data;
    multiple prefilters receiving the parallel channel outputs and providing prefilter outputs;
    multiple sampling filters receiving the prefilter outputs and providing multiple discrete time signal samples, each of the sampling filters including a sampling switch; and
    a self-timing circuit that receives the multiple discrete time signal samples at multiple inputs of the self-timing circuit and that provides a sampling control output that comprises a composite of the multiple discrete time signal samples combined into an adaptive linear transformation that controls each of the sampling switches.

19. The parallel channel timing recovery circuit of claim 18 wherein parallel channel inputs are read channel inputs of a data storage system, and the self-timing circuit restores read channel timing lost by storing and retrieving data in the data storage system.

20. The parallel channel timing recovery circuit of claim 18 wherein the self-timing circuit further comprises a joint timing and data detector that provides the adaptive linear transformation.

* * * * *